ST. CLAIR GUTHRIE, Jr.
ICE CUTTING MACHINE.
APPLICATION FILED JAN. 6, 1910.

1,014,593.

Patented Jan. 9, 1912.
2 SHEETS—SHEET 1.

Witnesses
Frank R. Glov
H. E. Rodgers

Inventor
St. Clair Guthrie Jr.
By George F. Thorpe Atty

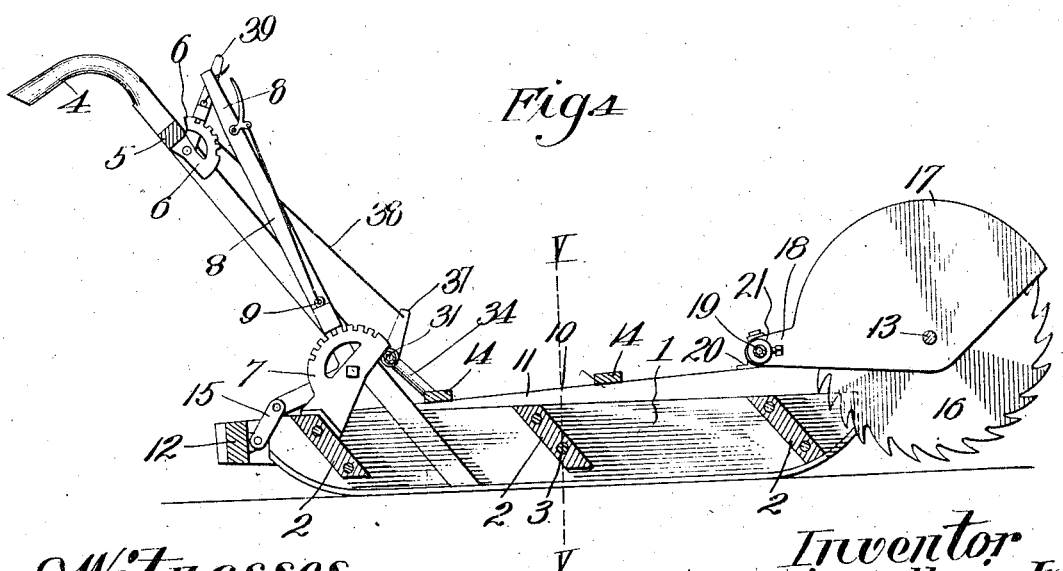

UNITED STATES PATENT OFFICE.

ST. CLAIR GUTHRIE, JR., OF BLUE RAPIDS, KANSAS.

ICE-CUTTING MACHINE.

1,014,593.   Specification of Letters Patent.   Patented Jan. 9, 1912.

Application filed January 6, 1910. Serial No. 536,736.

*To all whom it may concern:*

Be it known that I, ST. CLAIR GUTHRIE, Jr., a citizen of the United States, residing at Blue Rapids, in the county of Marshall and State of Kansas, have invented certain new and useful Improvements in Ice-Cutting Machines, of which the following is a specification.

This invention relates to ice cutting machines, and more especially to machines of that type embodying a support for traveling upon the ice, a rotary saw which can be adjusted vertically for engagement with or withdrawal from the ice on which the support travels, an engine movable with the support for revolving the saw, and guides for engagement with kerfs produced in the ice by the saw to compel the latter to make all subsequent kerfs parallel with the first one and equal distances apart, and my object is to produce a machine of this character which will operate efficiently and reliably and can be handled and controlled by a single attendant.

A further object is to produce a machine of this character of simple, strong, durable, compact and inexpensive construction.

Figure 1:
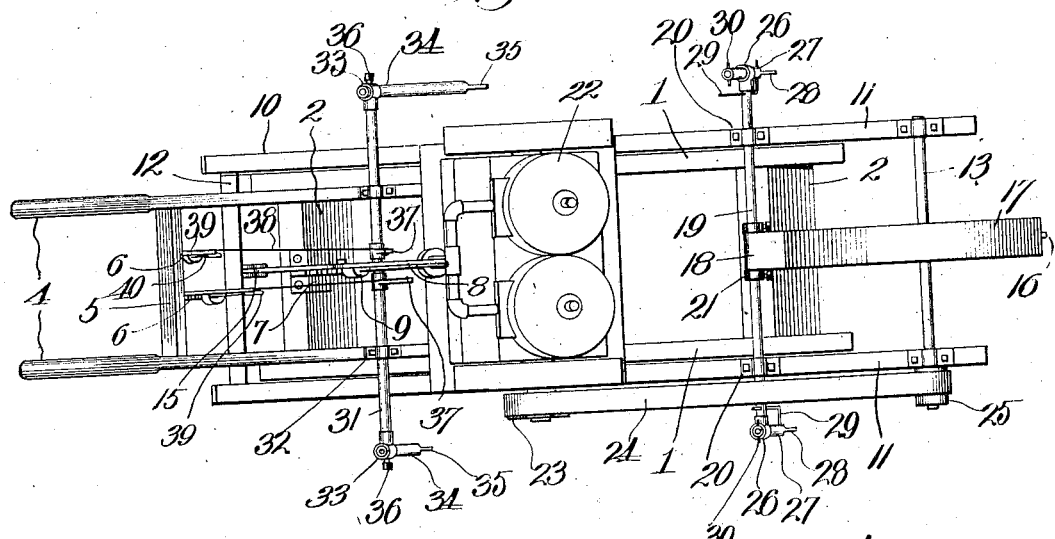
Figure 6:
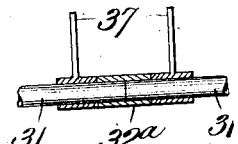
Figure 2:
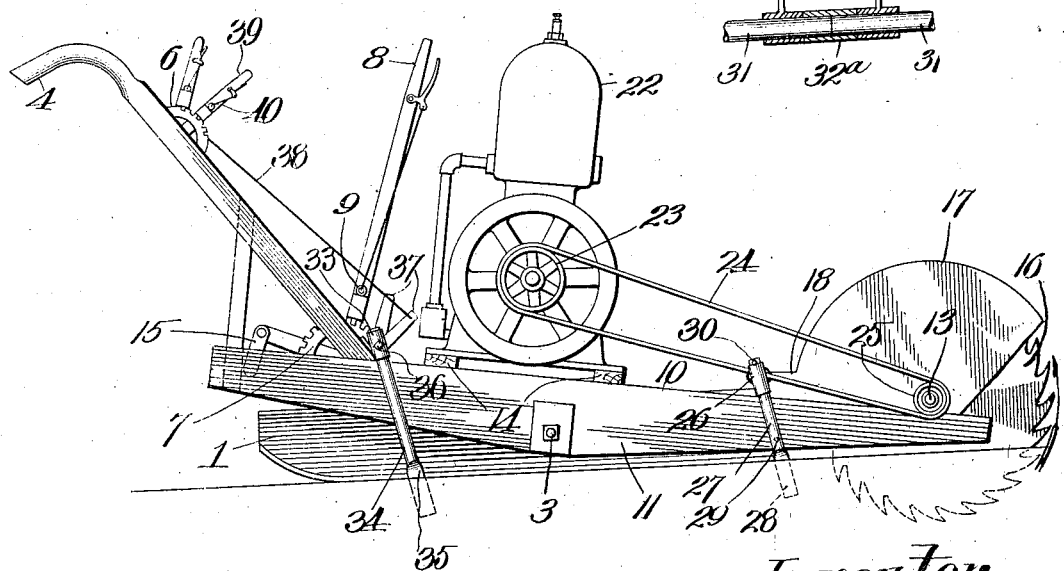

With these general objects in view and others as hereinafter appear, the invention consists in certain novel and peculiar features of construction and organization as hereinafter described and claimed; and in order that it may be fully understood reference is to be had to the accompanying drawings, in which;

Figure 1, is a top plan view of an ice cutting machine embodying my invention. Fig. 2, is a side view of the same. Fig. 3, is a front view of the same and also shows a cross section of a field of ice. Fig. 4, is a vertical longitudinal section between the saw and the near runner, the engine being omitted. Fig. 5, is a cross section on the line V—V of Fig. 4. Fig. 6, is a detail view showing the adjacent ends of the lever-controlled rock shafts, the crank-arms thereon and the sleeve forming a journal for the inner ends of said shafts.

In the said drawings, a sled consists of a pair of runners 1, connected by a plurality of cross bars 2.

3 is a pivot rod which extends through one of the cross bars by preference, and through the runners. The sled is provided with a pair of handles 4, of the plow-handle type, connected near their upper ends by a cross bar 5, equipped with sectors 6. The rear cross bar of the sled is also equipped with a sector 7, upon which an angle lever 8 is fulcrumed, said lever having a latch mechanism 9, for engagement with the sector 7.

10 is a tilting platform mounted upon the outer ends of pivot rod 3, and said platform consists of a pair of side bars 11 connected at their rear ends behind the sled, by a cross bar 12, and at their front ends forward of the sled by a transverse shaft 13. They are also connected above the sled by cross bars 14, for a purpose which hereinafter appears.

15 is a link pivotally connecting cross bar 12 with the angle lever 8, so that when said lever is swung forwardly or rearwardly it will depress or elevate the front end of the tilting platform, the latter rocking upon pivot rod 3.

16 is a circular saw mounted upon shaft 13, midway its length, and 17 a shield or guard mounted upon said shaft 13 and enveloping the upper portion of the saw, the said shield or guard having a rearwardly projecting portion 18 mounted upon a transverse rock shaft 19, journaled in bearings 20, secured to the upper edges of the side bars 11 of the tilting platform, collars 21 mounted on said rock shaft at opposite sides of the shield or guard holding the latter in proper relation to the saw.

22 is a gas engine or equivalent motor, secured upon the cross bars 14 of the tilting platform, the engine being so disposed with reference to the pivot rod 3, that it practically balances the saw, thus enabling the operator to rock the tilting platform with but little exertion.

23 indicates the belt pulley of the engine connected by a belt 24 to a pulley 25 on the shaft 13. Secured rigidly on the opposite ends of shaft 19 is a pair of T-couplings 26, and extending slidingly through the same are guides 27, having their lower ends flattened at 28, so as to be capable of sliding in the kerfs produced by the saw in the field of ice, and to guard against turning movement of the guides, the latter are equipped with angle rods 29, which extend inwardly from a point a suitable distance below the plane of the T-couplings and thence upwardly and slidingly through the rock-shafts, as shown clearly in Fig. 1. By this arrangement, the guides may be slid vertically upward until their lower ends clear the surface of the ice field and to prevent them from being lost in the event of passing over a hole in the ice they are equipped with cross pins 30, at their upper ends, which cross pins engage the upper ends of the T-couplings when the guides are at their lowest points of adjustment.

31 is a pair of alined rock-shafts arranged transversely at suitable points in bearings 32 secured to the handles 4, and journaled at their inner or abutting ends in a sleeve-bearing 32ª. The shafts are provided at their outer ends beyond the sides of the tilting platform with T-couplings 33, in which are adjustably secured guides 34 having their lower ends flattened as at 35, for engagement with kerfs produced in the ice by the saw, it being noticed that the flattened ends of the guides 34 are in longitudinal alinement with the guides 27, the guides 34 being adapted to be secured at the desired point of adjustment in the couplings by set screws 36. Each rock-shaft 31 is provided near its inner end with a crank-arm 37 connected by a link 38 with a hand lever 39, mounted on cross bar 5, and provided with a latch mechanism 40 for engagement with its respective sector 6.

Preliminary to the operation of cutting a field of ice, a substantially straight line is drawn upon the ice for the full length of the field. The guides 34 are then swung upward through the instrumentality of levers 39, to a point above the ice, if not already so disposed, the latch mechanisms by engagement with sectors 6, holding said guides in such elevated or inoperative position. The engine is then started and the platform gradually tilted by the manipulation of lever 8 until the saw is kerfing the ice, as it is not desired to entirely separate the cakes until they reach the point where they are to be removed from the water, and in thus adjusting the platform the guides 27 are caused by engagement with the ice to slide upward through couplings 26, so as to offer no resistance to the tilting operation and to be capable of dragging freely along upon the surface of the ice. The operator next grasps handles 4 and draws the machine backward so that the saw shall produce a kerf in the ice along the line marked out and when the opposite end of the field is reached, he retilts the platform to raise the saw out of the ice. He then turns the machine half around so that its rear end shall point toward the side of the field from which he started and so disposes it that one of the guides 27 is free to drop downward until its flattened end enters the kerf made by the saw. After the platform is tilted as before to cause the saw to cut into the ice to the required depth and produce a second kerf, the operation of the proper lever 39 is reversed to swing the said guide 34 downward and rearward until its flattened end enters the kerf so that the two guides 27 and 34 traveling in kerf maintain the saw in parallel relation to said kerf as the machine is drawn across the field a second time, so that the second kerf shall be parallel with the first. When the side of the field is reached from which the start was made, he reëlevates the guide 34 and secures it in its elevated portion, retilts the platform to withdraw the saw and guide 27 from the ice, and turns the machine around as before. The machine is then disposed at the opposite side of the second kerf from the first kerf so that the originally inoperative guide 27 may enter the second kerf. He then operates the other lever 39 to swing the connected guide downward and secures the said lever in its new position by the latch mechanism. He then operates lever 39 to cause said guide to enter the second kerf, retilts the platform to cause the saw to cut into the ice and proceeds as before, each subsequent operation being a repetition of one of those described so that eventually the entire field of ice is provided with parallel kerfs spaced equal distance apart. The operator starting at one side of the field draws a line on the ice at right angles to and intersecting the kerfs and in the manner explained, draws the machine back and forth across the field so as to produce cross kerfs substantially at right angles to the original kerfs. After this is done swages or parting bars are driven into certain of the kerfs at different points so as to divide the field into floats, each containing a large number of connected blocks of ice, as the ice in this condition can be floated to the desired point with greater convenience and facility and be more easily controlled than a large number of small independent blocks.

In action the saw operates in the direction indicated by the adjacent arrow Fig. 2, so that chips shall be thrown away from the operator and the shield 17 guards against a person being injured by the saw in the event of falling upon the machine when adjusting the driving belt or the guides or when otherwise engaged about the machine.

From the above description it will be apparent that I have produced an ice cutting machine embodying the features of advantage enumerated as desirable and I wish it to be understood that I do not desire to be restricted to the exact details of construction shown and described as obvious modifications will suggest themselves to one skilled in the art.

Having thus described the invention what I claim as new and desire to secure by Letters Patent, is:—

1. An ice cutting machine, comprising a support to travel upon the ice, a platform tiltingly mounted upon the support, a motor and a rotary saw carried by the tilting platform and bearing a substantially balanced relation with respect to the pivotal point of the platform, means connecting the motor and the rotary saw to drive the latter, a draft attachment for the machine at the opposite end of the same from that occupied by the saw, means whereby the platform may be tilted to raise or lower the saw, a transverse rock-shaft mounted on the tilting platform between the saw and motor, guides extending downward from and carried by said rock-shaft and capable of independent endwise sliding movement and provided with flattened lower ends, rock shafts suitably supported rearward of and above the tilting platform, independently adjustable guides extending from the said rock-shafts and provided with flattened lower ends in the same longitudinal plane as the flattened ends of the first-named guides, means for operating said rock-shafts, and means for securing said rock shafts against rotation.

2. An ice cutting machine, comprising a support to travel upon the ice, a platform tiltingly mounted upon the support, a motor and a rotary saw carried by the tilting platform and bearing a substantially balanced relation with respect to the pivotal point of the platform, means connecting the motor and the rotary saw to drive the latter, a draft attachment for the machine at the opposite end of the same from that occupied by the saw, means whereby the platform may be tilted to lower the saw, a transverse rock shaft mounted on the tilting platform between the saw and motor, guides extending downward from and carried by said rock-shaft and capable of independent endwise sliding movement and provided with flattened lower ends, rock shafts suitably supported rearward of and above the tilting platform, independently adjustable guides extending from the said rock-shafts and provided with flattened lower ends in the same longitudinal plane as the flattened ends of the first-named guides, means for operating said rock-shafts, levers suitably supported, connections between the same and the said rock-shafts whereby the latter may be operated, and means for locking said levers at the desired point of adjustment.

3. An ice cutting machine, comprising a sled, a tilting platform mounted upon said sled, a rotary saw and a motor mounted upon and bearing a balanced relation to said tilting platform, the saw being at the front end of said platform, means for transmitting motion from the motor to the saw, rigid handles projecting upward and rearward from the sled, a sector bearing a rigid relation to the sled, an angle lever fulcrumed on the sector, a link pivotally connecting the angle lever with the rear end of the tilting platform, a latch mechanism carried by the lever for engagement with the sector, a transverse rock shaft between the motor and the saw and carried by the tilting platform, guides extending downward from and carried by said rock-shaft and capable of independent endwise sliding movement, and provided with flattened lower ends, means secured to said guides and bearing a slidable relation to said rock-shaft to prevent turning or rotary movement of the guides, transverse rock shafts above the tilting platform and rearward of the motor and carried by said handles, guides slidingly secured to outer ends of said rock shafts and disposed in the same longitudinal planes as the first-named guides and provided with flattened lower ends, means to establish a rigid relation between the second guides and said rock-shafts, a crank arm projecting from each of said rock-shafts, levers carried by said handles near their upper ends, links connecting said levers with said crank arms, and means to lock said levers at the desired point of adjustment.

In testimony whereof I affix my signature, in the presence of two witnesses.

ST. CLAIR GUTHRIE, Jr.

Witnesses:
  Jno. McPherson,
  J. E. McPherson.